2,779,659

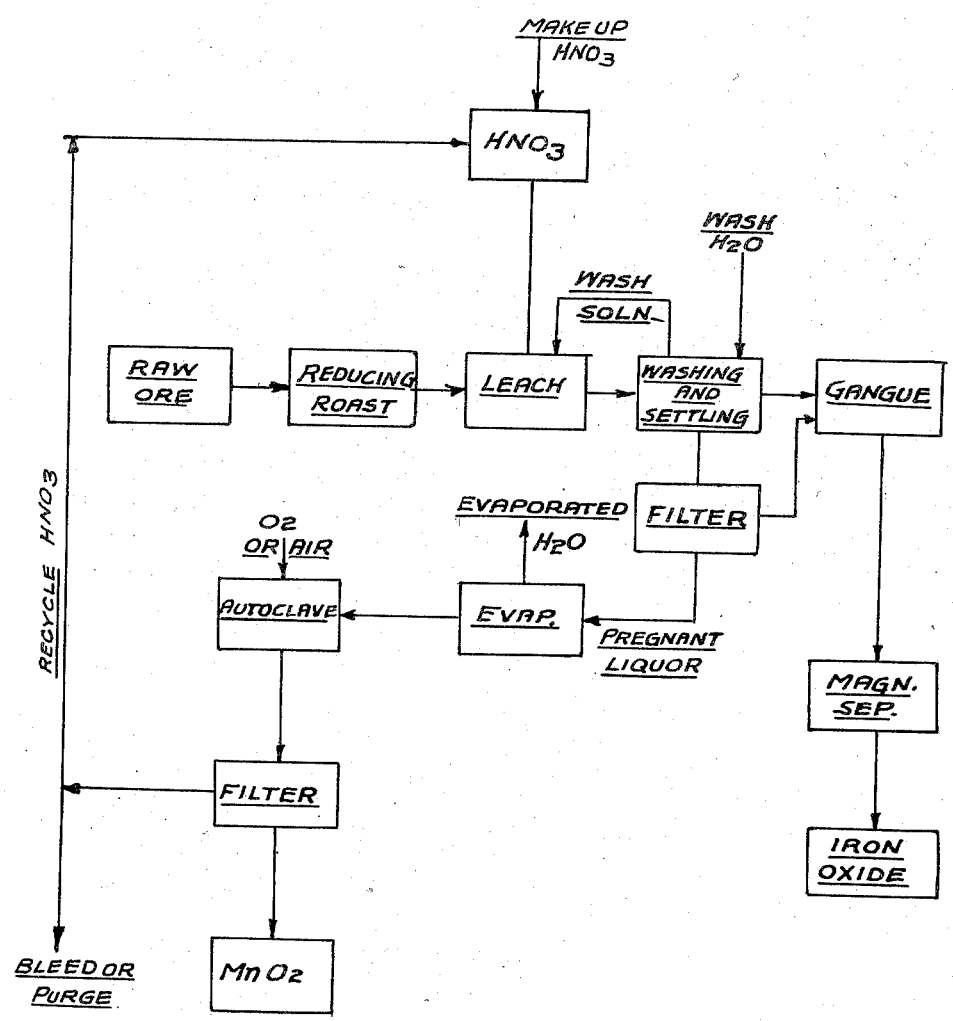

DECOMPOSITION OF MANGANESE NITRATE SOLUTIONS

Joseph Koslov, Great Neck, N. Y., assignor to Vitro Corporation of America, New York, N. Y., a corporation of Delaware Application October 23, 1953, Serial No. 388,015

6 Claims. (Cl. 23—145)

This invention relates to a chemical extraction process for the recovery of metal values from low grade ores and, in particular, to the manipulation of a solution of metals which form insoluble higher oxides, such as manganese, formed by leaching of typical low grade ore.

The basic importance of manganese as a strategic material in the national economy dictates, in times of scarcity and high standard, the utilization of practically any source of manganese. Domestic deposits of manganese ore usually contain the manganese in the form of the dioxide, lower oxides or carbonates, in which the amount of manganese may be as low as 4 percent. In the relatively higher grade domestic ores, it may be as high as 20 percent. For economical operations on ores by non-metallurgical processes it is necessary that the manganese content of the ore be as high as 40 percent. Commonly the lean domestic ores are so poor as to be unsatisfactory for beneficiation by flotation operations. Also the composition of the ore is often such that it cannot be beneficiated by a flotation operation. Similar considerations apply to other metals such as cerium, lead. Accordingly, it is a basic object of the instant invention to provide a process for decomposing a metal nitrate solution such as is prepared by leaching a low grade ore with nitric acid.

It is another object of the invention to provide a process for the decomposition of metal nitrate solutions characterized by its efficiency in removing the metal from the solution and in conserving the nitric acid value of the solution.

It is another object of the invention to provide a means for recovering certain metal values from ores characterized by its being carried out in liquid phase.

Other objects and advantages of the invention will in part be obvious and in part appear hereinafter.

The invention, accordingly, is based upon the capacity of certain metals to form a very insoluble oxide in an aqueous solution when subjected to strong oxidizing conditions and is embodied in the operation in which the metal nitrate solution is heated to a temperature in excess of about 200° C., and subjected to a pressure of air or oxygen such that the partial pressure of oxygen in the atmosphere above the solution will be at least about 50 pounds per square inch gauge and may range as high as 400 to 500 pounds per square inch. The metal oxide precipitated in the operation is separated from the nitric acid which remains in the liquid phase for recycling for further leaching, and the separated oxide can be dried for subsequent use.

The process is best understood by reference to the accompanying drawing which is a flow diagram of a typical leaching operation for treating a low grade manganese ore.

A typical ore such as pyrolusite, cryptomelane, ransdellite and psilomelane, which may contain, for example: 15 percent manganese, 25 percent iron and 5 percent silicon together with traces of lime and other common ingredients, is subjected to a reducing roasting in which the oxide ore is heated to a relatively high temperature in a reducing atmosphere so that the manganese is converted to one of its lower oxides.

The reduced ore is cooled and passed to the next stage of the operation, wherein nitric acid of a concentration of about 10 percent to 50 percent, preferably 30 to 40 percent, is added in amount per unit weight of ore which is at least stoichiometrically equivalent to the manganese present, and the mixture stirred for sufficient time to permit substantially complete solution of the soluble oxides of manganese.

The solution of manganese nitrate so formed, containing the insoluble portions of the ore in suspension as a slurry, is passed to a settling stage where sulfuric acid may be added to precipitate such alkaline earths as calcium and barium or such metals as lead, which may be carried over in small amounts. Following the settling the clear solution is filtered and the solid gangue passed on to disposal and possible magnetic recovery operations for removal of iron.

The filtrate from the settling operation may be evaporated to some extent if it is desired to concentrate it, and it is then passed to an autoclave where it is subjected to the decomposition step characteristic of the instant process. In the autoclave, which is formed of corrosion-resistant material (such as stainless steel lined pressure vessel), the solution is heated to a temperature of at least about 200° C. and oxygen or air is forced into the autoclave to bring the partial pressure of oxygen to at least about 50 p. s. i. The solution is held at this elevated temperature and pressure for a period of at least 30 minutes, and preferably about an hour, following which it is vented and cooled and passed to a filter to remove precipitated manganese dioxide. In the venting an indication of the degree of effectiveness of the operation in reclaiming the nitric acid values of the solution can be obtained from the color of the fumes passed out, for if the pressure has not been maintained at a sufficiently high level, heavy fumes of nitric oxides will be observed. However, in general with operations at or above about 200 p. s. i., 80 to 90 percent recovery of the nitrate values of the solution is easily obtained, and at higher pressures substantially quantitative recovery can be obtained. The filter cake of solid manganese dioxide is then washed and dried for further refining for manganese or disposal. The nitric acid appearing in the filtrate is recycled for use in the leaching operations and, as indicated, it will generally be recovered to about 90 percent effectiveness or better.

In the course of recycling the acid, there will develop an accumulation of impurities, such as calcium, iron and lead salts, in the solution. These can be kept to a low level by bleeding off a part of the acid used in recycling and making it up with a fresh addition.

A detailed consideration of the chemical reactions and equilibria involved may be understood from the equation and the several specific examples illustrating recovery operations. The chemical reaction involved is as follows:

$$2Mn(NO_3)_2 + 2H_2O + O_2 = 2MnO_2 + 4HNO_3 \text{ (solution)}$$

As noted from the equation, manganese nitrate in aqueous solution in an oxidizing atmosphere will form manganese dioxide and nitric acid. By maintaining the pressure at a high level the nitric acid is kept in the aqueous phase. The results obtained in autoclave experiments in carrying out the decomposition reaction indicate that it will proceed as desired to produce precipitated manganese dioxide and a liquor containing the fixed nitrogen from the decomposition of manganese dioxide as nitric acid. In this way one of the real advantages of the process is realized in that liquid phase is maintained throughout. Though it is found economically practicable to use air or oxygen as the oxidizing medium it is apparent that hydrogen peroxide would also do.

Example I

A 4.76 molar solution of manganese nitrate was heated in a closed autoclave to about 200° C. (developed pressure about 300 p. s. i. g.) and then sufficient superimposed oxygen pressure was applied to bring the total pressure up to 450 p. s. i. g. After a 20 minute reaction time the oxygen supply was cut off and the system cooled rapidly to room temperature and filtered at atmospheric pressure. Upon releasing pressure from the autoclave, large amounts of $N_2O_4$ were observed indicating that the fixed nitrogen was not completely retained as nitric acid. Analysis indicated 44 percent of the manganese had precipitated as manganese dioxide. However, 55 percent of the $NO_2$ released from the decomposition remained as $HNO_3$ in solution.

Example II

A 4.76 molar manganese nitrate solution was heated in a closed autoclave to about 220° C. (developed pressure about 350 p. s. i.) and sufficient oxygen pressure then added to increase the total pressure to 550 p. s. i. g. After 30 minutes reaction time the system was cooled while the total pressure was maintained at 500 p. s. i. with oxygen. The solution was then filtered under 500 p. s. i. pressure. No $N_2O_4$ vapors were noticed when the system was vented to the atmosphere. Analysis showed 55 percent of the manganese precipitated as manganese dioxide and 82 percent of the $NO_2$ freed by the decomposition remained as $HNO_3$ in solution.

Further examples of the process are tabulated below and in each case the procedure was to heat the solution to reaction temperature in a sealed reactor, apply appropriate oxygen pressure, hold it for one hour and cool to room temperature. The material was then filtered under pressure and the pressure finally relieved.

Table I

| Exp. No | 6 | 7 | 8 |
| --- | --- | --- | --- |
| Reaction Temp. | 240° C | 240° C | 240° C. |
| Reaction pressure | 500 p. s. i | 500 p. s. i | 500 p. s. i. |
| Superimposed $O_2$ pressure | 200 | 400 | 400 (as in air). |
| Analyses: | | | |
| Ppt | 27.4% Mn | 18.8% Mn, 20.1% Fe. | 10.5% Mn. |
| Supernate | 0.57 M Mn, 7.4 M $NO_3$—. | 2.11 M Mn, 9.0 M $NO_3$—, 0.03 M Fe. | 0.86 M Mn, 7.9 M $NO_3$—, .0034 M Fe. |
| Mn ppt'd as $MnO_2$—, percent. | 88 | 55.5 | 92. |
| Percent $NO_3$ Retained. | 75 | 91.2 | 79. |
| Remarks | Fe present rom reaction in ppt.; ppt. magnetic. | Same as (6) | Little iron present from reactor. |

In operation, it is found best to use nitric acid of about 30–40 percent concentration. With effective recovery operations, the nitric acid is conserved and the acid recovered from the precipitation step is about 50 percent concentration.

In separating another metal which has the property of forming a nitric acid insoluble oxide leaving the metal in a higher valence state than is usual, the same manipulations are carried out with similar results. That is, metals such as cerium and lead may be leached from thin ores by nitric acid and, in such solution, be oxidized to a higher valence state and precipitated as the oxide.

Though the invention has been described with reference to a specific embodiment thereof, it is to be understood that variations thereof may be practiced without departing from its spirit or scope.

What is claimed is:

1. The method of recovering metal oxides of metals capable of forming an aqueous nitric acid insoluble oxide from an aqueous nitrate solution thereof, comprising subjecting the solution to reaction conditions of a temperature above about 200° C. in a closed reaction zone and also adding to the reaction zone sufficient oxygen to raise the partial pressure of oxygen to at least about 50 pounds per square inch gauge, maintaining the temperature and pressure conditions for a period of at least about 15 minutes and subsequently separating precipitated oxide from the aqueous nitric acid medium.

2. The process in accordance with claim 1, wherein the aqueous metal nitrate solution is an acid solution of manganese nitrate obtained from the extraction of manganese ores and contains at least about ten percent manganese.

3. The process in accordance with claim 2, in which the solution in the reaction zone is cooled and filtered under the developed pressure.

4. In the process of recovering manganese values as manganese dioxide from low grade manganese ores which involves reducing the said ores and leaching the ores with a nitric acid solution to form a manganese nitrate solution, the improvement which comprises subjecting the manganese nitrate solution containing at least about ten percent manganese to temperature and pressure conditions such that the solution is held in a reaction zone at a temperature in excess of 200° C. under pressure such that the partial pressure of oxygen is at least about 50 pounds per square inch gauge for a period of at least 15 minutes thereby to form a manganese dioxide precipitate and, thereafter, separating the manganese dioxide precipitate from said nitric acid medium under pressure and recycling the recovered nitric acid.

5. The process in accordance with claim 4 in which air is used as the gaseous oxidizing medium.

6. The process in accordance with claim 4 in which oxygen is used as the oxidizing medium.

References Cited in the file of this patent

UNITED STATES PATENTS

| 1,293,461 | Kaplan | Feb. 4, 1919 |
| 1,761,133 | Laury | June 3, 1930 |
| 2,374,674 | Fox et al. | May 1, 1945 |
| 2,681,268 | Nossen | June 15, 1954 |

FOREIGN PATENTS

| 311,271 | Great Britain | Jan. 23, 1930 |

OTHER REFERENCES

Thorpe: "Dictionary of Applied Chemistry," vol. III, page 491, fourth edition, 1946, published by Longmans, Green and Co., New York.